United States Patent [19]

Matsumoto

[11] Patent Number: 5,801,814
[45] Date of Patent: Sep. 1, 1998

[54] SPLIT IMAGE EXPOSURE METHOD

[75] Inventor: Nobuo Matsumoto, Kanagawa, Japan

[73] Assignee: Fuji Photo Film Co., Ltd., Kanagawa, Japan

[21] Appl. No.: 600,043

[22] Filed: Feb. 12, 1996

[30] Foreign Application Priority Data

Mar. 28, 1995 [JP] Japan .................. 7-069543

[51] Int. Cl.$^6$ .............. G03B 27/52; G03B 27/32; G03B 27/54
[52] U.S. Cl. .............. 355/40; 355/32; 355/67; 349/8
[58] Field of Search .............. 349/1–5, 8–10; 355/32, 40, 67; 348/761, 766, 756, 757

[56] References Cited

U.S. PATENT DOCUMENTS

| | | | |
|---|---|---|---|
| 4,989,954 | 2/1991 | Yokoyama et al. | 350/337 |
| 5,092,664 | 3/1992 | Miyatake et al. | 359/41 |
| 5,109,290 | 4/1992 | Imai | 359/54 |
| 5,196,952 | 3/1993 | Hirai et al. | 359/51 |
| 5,379,137 | 1/1995 | Hirai et al. | 359/51 |
| 5,548,348 | 8/1996 | Kawabata et al. | 348/766 |
| 5,623,349 | 4/1997 | Clarke | 349/8 |
| 5,633,737 | 5/1997 | Tanaka et al. | 349/95 |

FOREIGN PATENT DOCUMENTS

| | | | |
|---|---|---|---|
| 57-160667 | 10/1982 | Japan | B41J 3/21 |
| 62-141855 | 6/1987 | Japan | H04N 1/23 |
| 2-32850 | 2/1990 | Japan | B41J 2/00 |
| 4-3856 | 1/1992 | Japan | G02F 1/1335 |

Primary Examiner—R. L. Moses
Assistant Examiner—Shival Virmani
Attorney, Agent, or Firm—Sughrue, Mion, Zinn, Macpeak & Seas, PLLC

[57] ABSTRACT

A split image exposure method capable of realizing high-resolution and high-quality exposure of an image by suppressing discontinuity of density and color in junctions between split images when the original image divided into a plurality of subdivisions is exposed using a planar element. A LCD panel can be positioned at four different locations in a horizontal plane, and it receives light from a light source in respective locations and can print a transmission image onto a color printing paper through a projection lens system by exposure. A reference mark is captured based on a difference in the amounts of light received by light receiving portions of the sensor, whereby the positioning of the LCD panel can be completed. The occupancy ratio of image data representing each split image is varied in double-exposed or fourfold-exposure areas, and the density of each pixel of the liquid crystal panel is controlled in accordance with this occupancy ratio. As a result, discontinuity of color and density is reduced to almost zero.

21 Claims, 15 Drawing Sheets

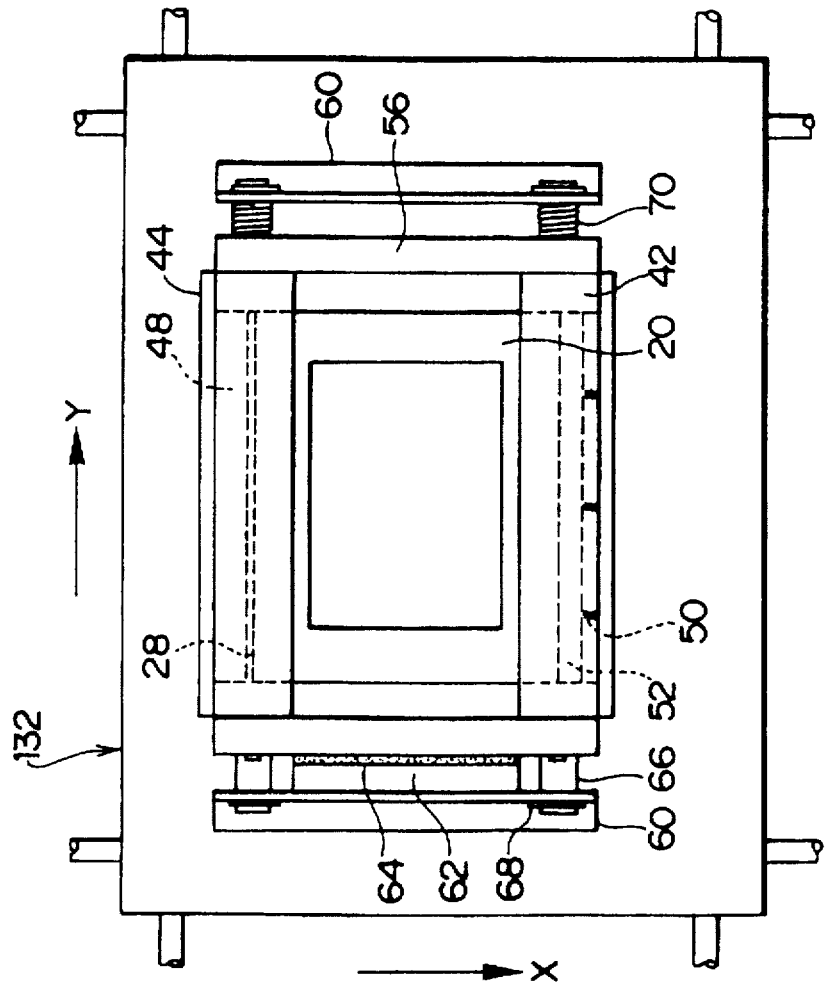
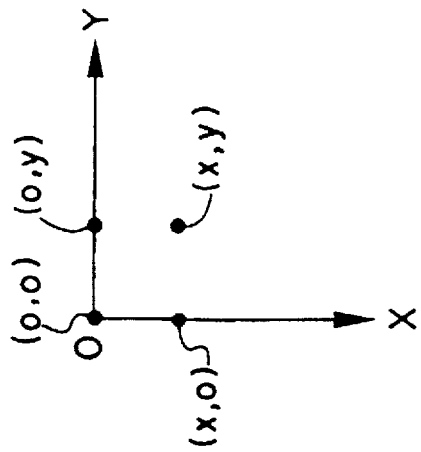

SPLIT IMAGE EXPOSURE METHOD

BACKGROUND OF THE INVENTION

1. Field of the Invention

This invention relates to a split image exposure method for exposing an original image split into subdivisions which is suitable for a photographic printer in which the transmission density of each pixel of a planar element such as a liquid crystal panel is controlled such that an image is produced on the planar element, and the produced image is printed onto a photosensitive material by exposure.

2. Description of the Related Art

As disclosed in JP-A-57-160667, an exposure technology using a planar element such as an LCD panel (hereinafter referred to as an LCD panel), has been proposed, wherein an image is formed by scanning exposure. As opposed to scanning exposure, a plane exposure technology has been proposed as disclosed in JP-A-62-141855, wherein images in the three primary colors are successively displayed on a black and white CRT, and these images are printed onto color printing paper through respective RGB filters by exposure.

Utilizing these technologies in combination, monochrome images corresponding to the respective three primary colors are displayed on an LCD, and exposure is repeated three times selectively using three color filters, whereby a color image is easily obtained using the LCD.

An LCD has some 1,500,000 pixels (rows by columns) and is suitable for producing small-sized prints, for example, L size prints (measuring 89 mm×127 mm), because each image displayed on the LCD can be directly printed onto the printing paper without substantial enlargement.

In contrast to this, for prints of larger sizes, for example, P size prints (measuring 89 mm×254 mm) and quarter size prints (measuring 254 mm×305 mm), an image displayed on the LCD panel has to be greatly enlarged in accordance with the size of each print, resulting in deterioration of the image quality (resolution).

This problem can be solved by a technique in which each original image is divided into segments, and the thus split segments (hereinafter referred to as split images) are displayed on an LCD panel in a segment-by-segment fashion. The LCD panel or printing paper is moved after each split image is printed. This technique is disclosed in JP-A-2-032850.

In the above conventional technique (JP-A-2-032850), multiple exposure is performed using a CRT. However, this patent publication discloses as its object only the realization of a concentration gradient for making image distortions less noticeable, and no consideration was given to the discontinuity of density and color at junctures where the images are joined. Therefore, the multiple exposure provided by the conventional technique is incomplete.

SUMMARY OF THE INVENTION

The present invention has been conceived in view of the above-described drawbacks, and an object of this invention is to provide a split image exposure method in which an original image is exposed onto a printing paper using a planer element after having been divided into segments, and which can produce an image having high resolution and quality, while suppressing discontinuity of density and color at junctures between the split images.

According to a first aspect of the invention, a split image exposure method is provided wherein an original image to be exposed is divided into a plurality of split images, and the plurality of split images are successively displayed on a planar element while the displayed split images are successively projected onto different areas of a photosensitive material, thereby successively printing the displayed split images on the photosensitive material.

According to a second aspect of the invention, a split image exposure method is provided wherein an original image to be exposed is divided into a plurality of split images, and the plurality of split images are successively displayed on a planar element while the planar element is successively positioned at a plurality of split positions so as to project the displayed split images onto different areas on a photosensitive material, thereby successively printing the displayed split images on the photosensitive material.

According to a third aspect of the invention, a split image exposure method is provided wherein an original image to be exposed is divided into a plurality of split images, and the plurality of split images are successively displayed on a planar element while an optical system is caused to change the direction of projection of each split image displayed on the planer element so as to successively project the displayed split images onto different areas on a photosensitive material, thereby successively printing the displayed split images on the photosensitive material.

According to a fourth aspect of the invention, the methods according to the first, second, and third aspects include an additional feature in which a junction between split images is connected by aligning reference marks displayed on the planar element.

According to a fifth aspect of the invention, the method according to the fourth aspect includes an additional feature in which each of the reference marks has at least three density levels.

According to a sixth aspect of the invention, the method according to the fourth or fifth aspect includes an additional feature in which alignment of the reference marks is carried out by at least one of movement of the planar element itself, movement of pixels on the planar element, and change in the direction of projection of each split image caused by an optical system.

According to a seventh aspect of the invention, the method according to any one of the first through sixth aspects includes an additional feature in which adjacent split images are projected by exposure so as to overlap, and the reference density of the overlapped area is made equal to the reference density of the non-overlapped areas.

According to an eighth aspect of the invention, the method according to the seventh aspect includes an additional feature in which the reference density of each of the overlapped split images in the overlapped area is controlled in accordance with a function of the distance from one end of the overlapped area adjacent to one split image to a position between the one end and the other end of the overlapped area adjacent to the other split image.

In the first aspect of the invention, if a relatively large image is exposed and printed onto a photosensitive material, the resolution of a planar element (depending on the number of pixels) may result in a print image with undesirable quality. Therefore, the original image is divided into a plurality of subdivisional images, and the thus split images are in turn displayed on a planar element and, subsequently printed onto a photosensitive material by exposure. As a result, it becomes possible to obtain a relatively large print image while the resolution of the split images to be exposed for printing is maintained. In this case, the displayed split images are projected onto respective split image areas (sprint positions). A variety of means, such as mechanical or optical means, can be employed for moving the split image so long as the means provides a continual junction between the adjacent split images.

The continual junction requires density and color continuity as well as low image distortion. Therefore, it is preferable to decrease the amount of movement of a movable member as much as possible whether mechanical means or optical means is used.

In the second aspect of the invention, the planar element displaying the split image is successively moved to a plurality of split positions corresponding to a plurality of split images. This movement is effected after each surface exposure. In each movement, the planar element is shifted over a distance which is greater than about 100 times the pitch of pixels. Evidently, this movement of the planar element is completely different from the movement of light in a scanning exposure method.

The movement of the planar element eliminates the necessity for moving, for example, an optical system or a photosensitive material on which an image is printed by exposure, thereby allowing the simplest exposure of a split image with high accuracy.

In the third aspect of the invention, as opposed to the shifting of the image resulting from the movement of the planar element in the second aspect, the optical axis of the split image (a transmission image) is deflected by moving the optical system. Although this is one method for exposing split images, the deflection of the optical axis may brings about a distorted image. Consequently, the image obtained as a result of the shifting of the optic axis is slightly inferior in quality to the image obtained by the method disclosed in the first aspect. On the other hand, the extent of movement of an optical system is smaller than that of the planar element, which results in ease of fine adjustment.

In the fourth aspect of the invention, a reference mark is created, using pixels outside the area of the planar element in which each split image is displayed. The reference mark corresponds to what is known as a register mark used for registration in the printing industry. The reference mark also corresponds to bar-like marks provided along the edges of a paper sheet in the case where an OCR (optical character recognition) system clips machine readable letters or symbols out of the sheet.

In other words, the reference mark is indispensable for determining the positional relationship between split images, because it is useless to divide an image into pieces unless the positional relationship between the split images is available. As means for aligning the reference marks, one mark comprising at least one pixel having a different transmission density from that of its surrounding pixels (e.g. black with white surroundings), and one mark sensor are required in the case of half-divided exposure. At least two marks and two mark sensors are required in the case of quartered exposure.

For example, when two sensors disposed side by side are located in a pixel area designated as a reference mark, the reference mark moves in a lateral direction in accordance with a difference in the amount of received light between the sensors until they both receive the same amount of light. When the sensors receive the same amount of light, the planar element is then moved in a longitudinal direction based on the difference between the amount of actually received light and a predetermined amount of received light. It is judged that the reference mark is captured when the sensors both receive the same amount of light equal to the predetermined amount. With this operation, the respective split images can be accurately positioned.

A square arrangement of four sensors allows simultaneous ascertainment of differences in the amount of received light in the horizontal and perpendicular directions, thereby resulting in reduced time to capture the reference mark.

In the fifth aspect of the invention, the reference mark is made up of a plurality of pixels instead of one pixel and is circularly formed. The circular reference mark has the highest transmission density area at its center and the lowest transmission density area at its outer periphery at least in three different levels. This arrangement makes it possible to easily detect the center of the reference mark even when the sensor greatly deviates from the center of the reference mark, and to quickly capture the reference mark.

In the sixth aspect of the invention, the alignment of the reference marks entails the movement of an image. The image is moved by at least any one of movement of the planar element, movement of the pixels on the planar element, and change in the direction of projection of each split image caused by the optical system. In other words, moving the planar element and changing the direction of projection by the optical system are suitable to move the split image by a large amount, whereas moving pixels on the planar element is used for fine positional adjustment. The optimum selection of the movements depending on the situation enables prompt alignment (capturing) of the reference mark.

In the seventh aspect of the invention, when a split image is exposed, that split image is exposed in such a way that the periphery of the split image overlaps with an adjacent split image. Compared to non-overlapped areas which are usually exposed only once (three times for color printing), the overlapped areas are exposed twice (six times for color printing). For this reason, the density of the double-exposure areas is determined so as to match the reference density of the single-exposure areas. This enables consistent reference density over the image regardless of whether the image is exposed once or twice.

In the eighth aspect of the invention, in the case of the double-exposure area, e.g., where two split images are put side by side, a function (direct proportion) has been determined for a distance from one on the left side to another on the right side. The density of the double-exposure area between the split images is controlled based on that function. In other words, the split image on the left has a larger density toward its left end, whilst the split image on the right has a larger density toward its right end (the density ratio of the left split image to the right split image is 1:1 at the middle of the distance between the two images). This enables suppression of discontinuity in density and in color for a color image between the split images.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 7A is a plane view showing the LCD panel and its periphery;

FIG. 7B is a chart showing motion vectors of the LCD panel;

DESCRIPTION OF THE PREFERRED EMBODIMENTS

Preferred embodiments of the present invention will be described hereinbelow. The present invention is based on the assumption that split images which are obtained by dividing each original image are successively displayed on an LCD panel which serves as a planar element, and that the displayed split images are printed onto color printing paper by exposure. Four types of split image exposure will be first described.

[Exposure Utilizing Movement of LCD Panel]

Figure 1:
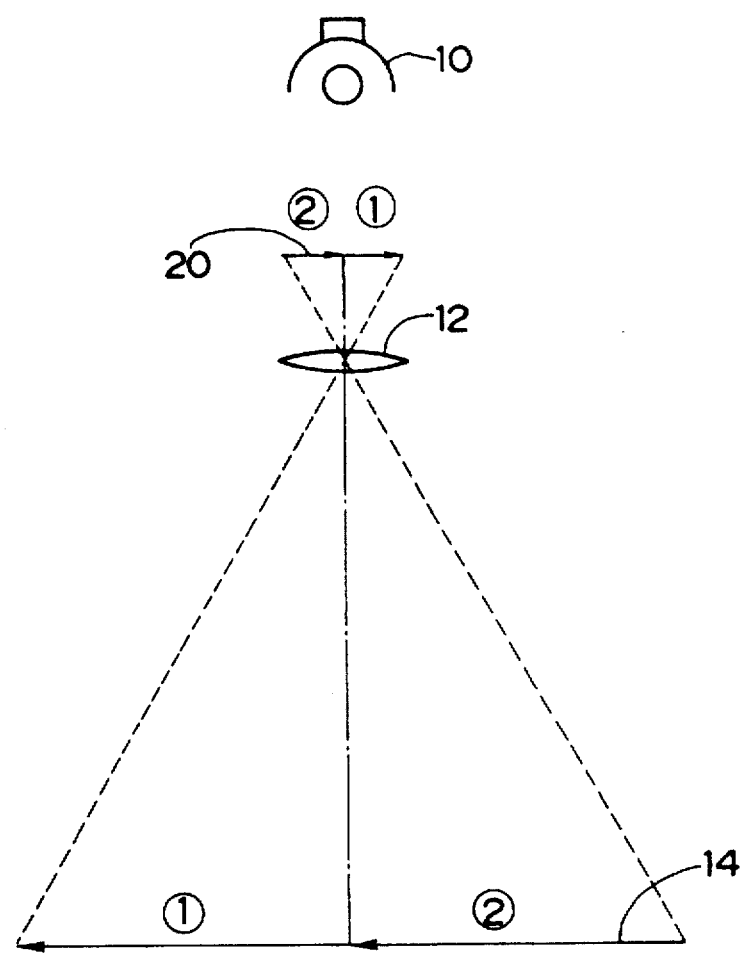
FIG. 1 is an illustration schematically showing exposure utilizing movement of an LCD panel.

As shown in FIG. 1, when a split image displayed on an LCD panel 20 located at the position indicated as (1) is illuminated by a light source 10 of an optical system, a transmission image corresponding to the split image displayed on the LCD panel 20 is produced. The transmission image is then enlarged by a lens 12 of the optical system. The thus enlarged image is printed onto the area indicated as (1) on color printing paper 14 by exposure. Thereafter, the LCD panel 20 is moved from position (1) to position (2), and another split image displayed on the LCD panel 20 is enlarged by the lens 12 in the same manner. The thus enlarged image is printed onto the area (2) on the color printing paper 14 by exposure.

As described above, only the LCD panel 20 is moved. Therefore, the rest of the optical system can be used in common.

[Exposure Utilizing Movement of Optical Lens]

Figure 2:
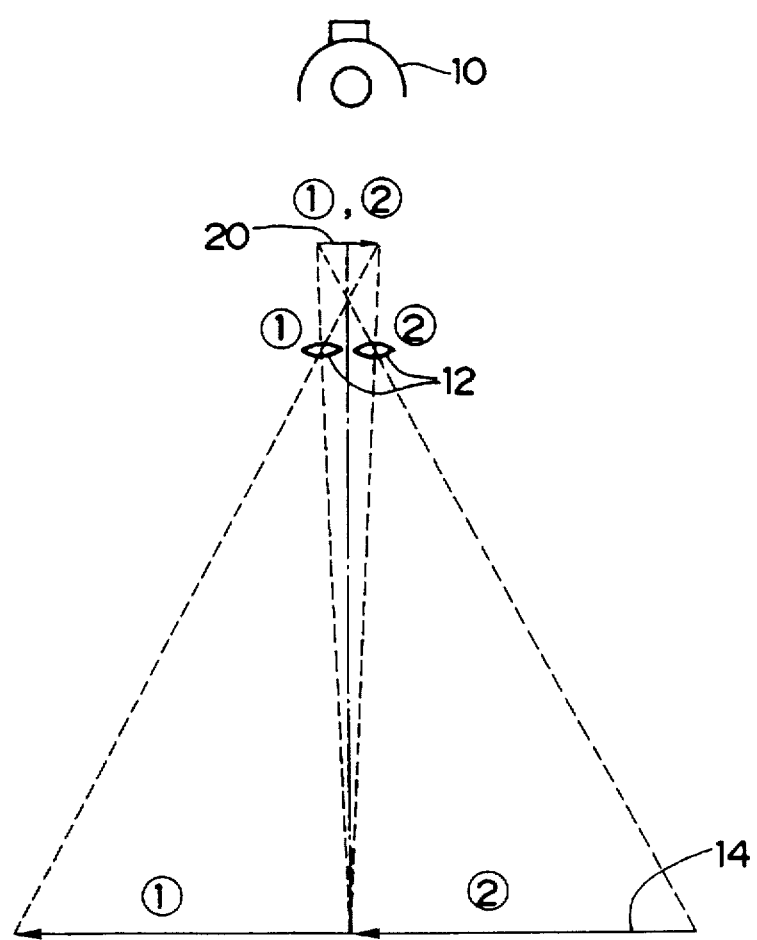
FIG. 2 is an illustration schematically showing exposure utilizing movement of an optical lens.

As shown in FIG. 2, the original images (1) and (2) are formed in turn at the same position. For the original image (1), the lens 12 is positioned at (1), so that the original image (1) is printed on the area (1) on the color printing paper 14. On the other hand, for the original image (2), the lens 12 is positioned at (2), so that the original image (2) is printed on the area (2) on the color printing paper 14.

In this construction, since the lens 12 is moved, original images are displayed at a fixed position.

[Exposure Utilizing Movement of Color Print Paper]

Figure 3:
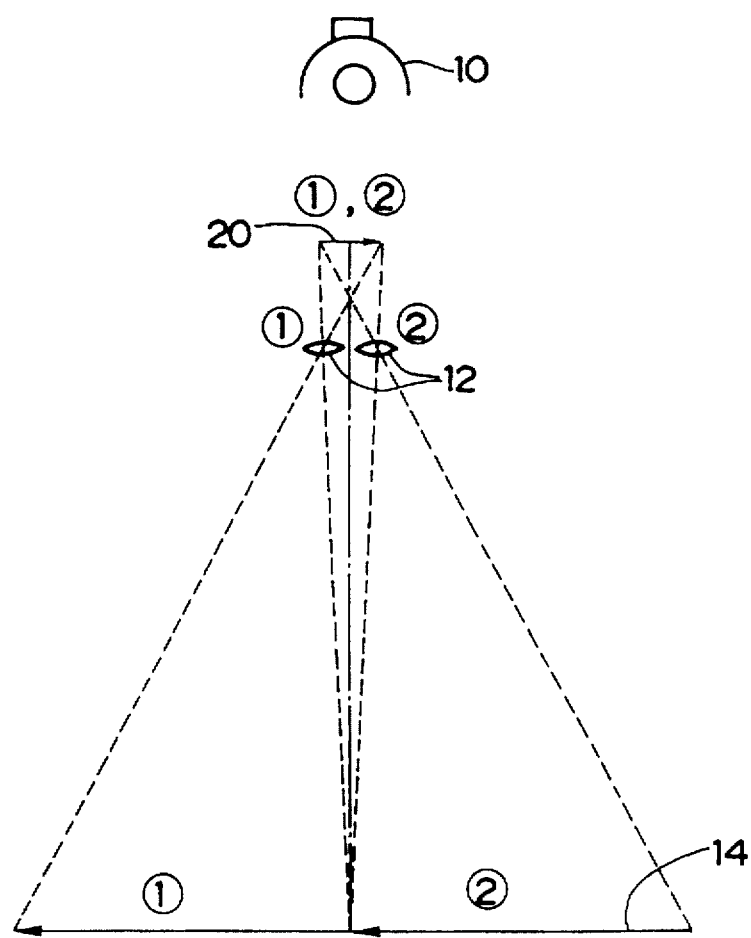
FIG. 3 is an illustration schematically showing exposure utilizing movement of a color printing paper.

As shown in FIG. 3, the original images (1) and (2) are formed in turn at the same position, and an optical system including the lens 12 is also kept fixed at a predetermined position. After the original image (1) has been printed by exposure onto a first portion of the color printing paper 14 located in an exposure area, the printing paper 14 is moved such that a second portion of the printing paper 14 adjacent to the first portion is positioned in the exposure area. The original image (2) is then printed on the color printing paper 14 by exposure.

In other words, the split images are printed by moving the color printing paper 14 without the movement of other parts of the exposing apparatus.

[Exposure Utilizing Deflection of Reflective Optical Mirror]

Figure 4:
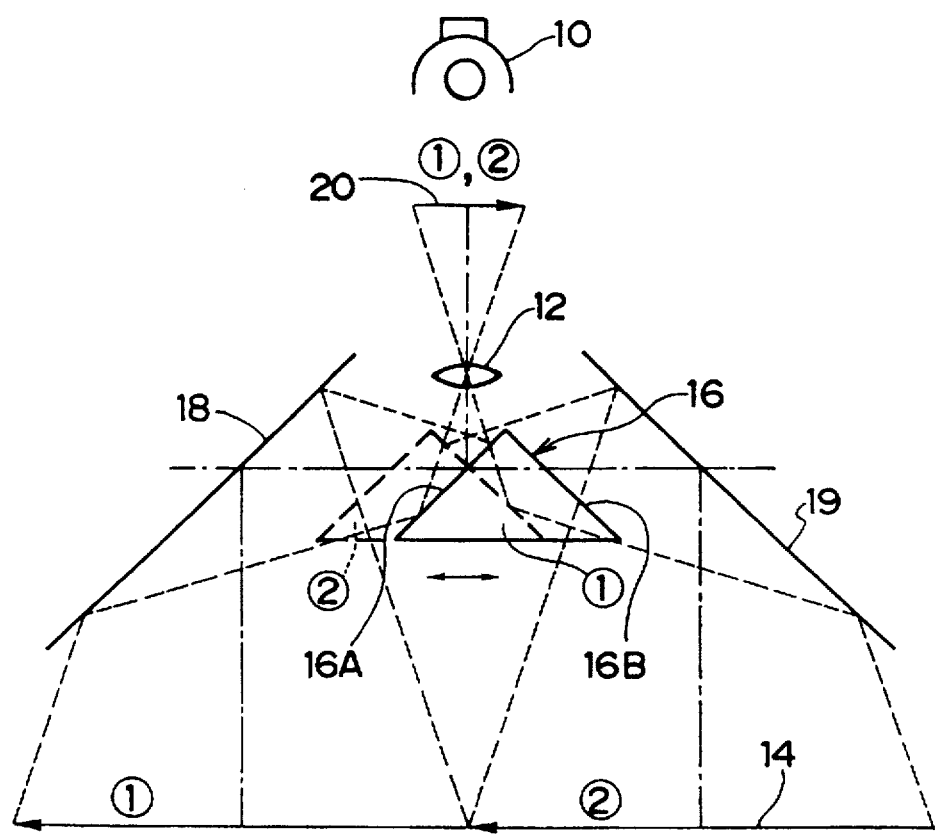
FIG. 4 is an illustration schematically showing exposure utilizing deflection of an optical reflecting mirror.

As shown in FIG. 4, the original images (1) and (2) are formed in turn at the same position, and the lens 12 stays fixed at its position. A triangular mirror unit 16 having a right angle at its top is positioned on the downstream side of the lens 12. The mirror unit 16 is movable in the lateral direction in FIG. 4. The slanted surfaces of the mirror unit 16 serve as reflecting planes 16A and 16B.

When the mirror unit 16 is positioned at the right end of the range of movement thereof, the light passing through the lens 12 is reflected by the reflecting plane 16A and a mirror 18 so that the original image (1) is printed by exposure onto the area (1) of the color printing paper 14.

On the other hand, when the mirror unit 16 is positioned at the left end, the light passing through the lens 12 is reflected by the reflecting plane 16B and a mirror 19 so that the original image (2) is printed by exposure onto the area (2) of the color printing paper 14.

In other words, this structure is designed so as to change the direction of the light passing through the lens 12 in the right or left direction by horizontally moving the mirror unit 16.

Details of the split exposing apparatus employing the present invention will be described, taking the apparatus described in [Exposure Utilizing Movement of Liquid Crystal Display Panel] as an example.

Figure 5:
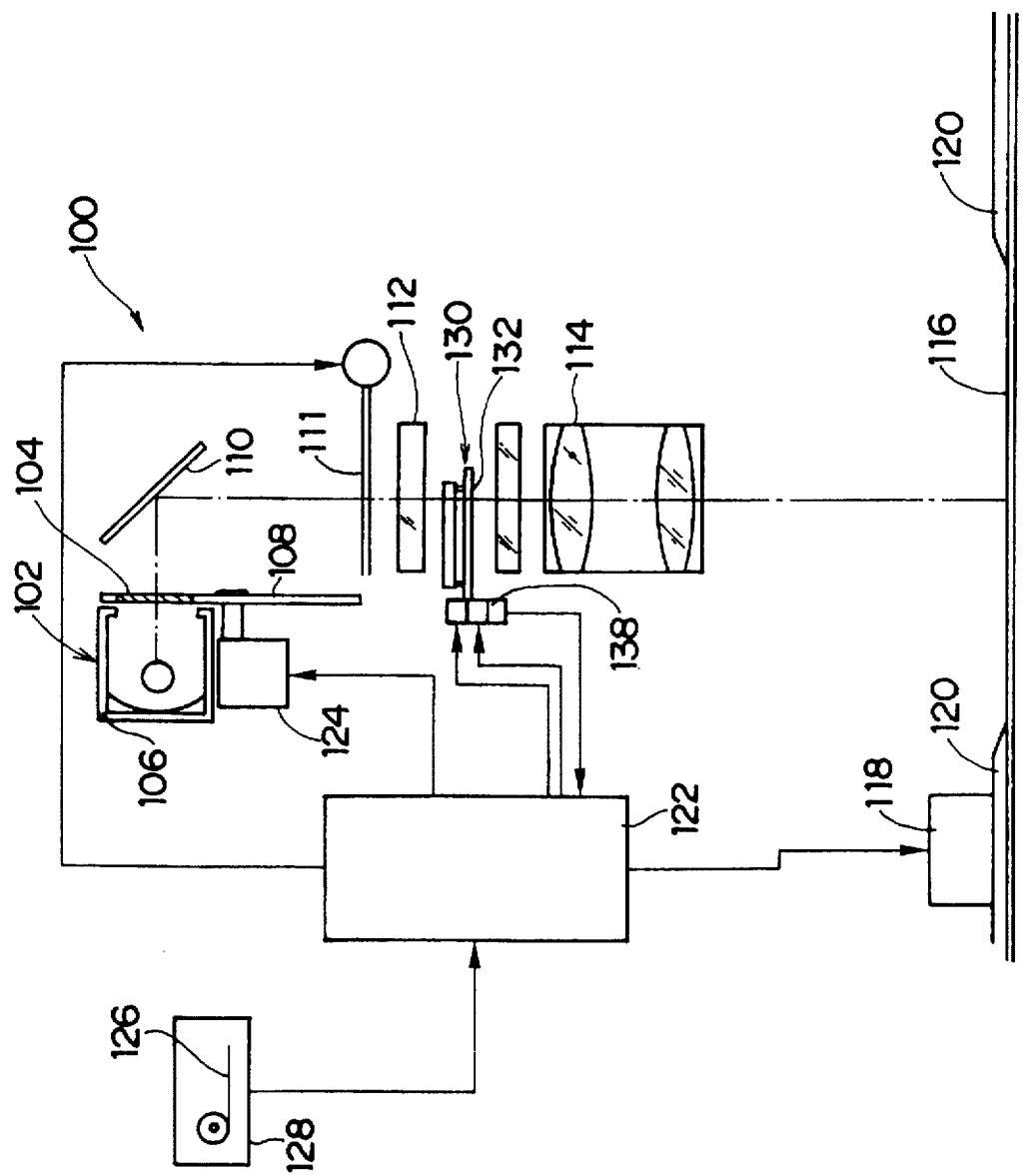
FIG. 5 is a schematic diagram showing the structure of a photographic printer according to an embodiment of the present invention.

FIG. 5 shows a photographic printer 100 according to an embodiment of the present invention.

In FIG. 5, an LCD panel 20 (shown in FIGS. 6 and 7) is held by an LCD panel unit 130. Light emitted from a light source 102 is illuminated onto the image display surface of the LCD panel 20 through separation filters 104 for R, G and B colors.

The light source 102 is housed in a box 106. The box 106 is provided with the separation filters 104 on its light exit surface. The separation filters 104 are built into a circular turret plate 108 such that one of the three separation filters 104 is selectively positioned in the optical path.

A reflecting mirror 110 is positioned, at an angle of 45 degrees, opposite to the light exit surface of the box 106. The light horizontally output from the light source 102 is deflected by the reflecting mirror 110 at the right angle, reaching a converging lens 112 via a black shutter 111. The LCD panel 20 is positioned on the downstream side of the converging lens 112.

The LCD panel 20 has a size corresponding to one of the quartered surfaces of the converging lens 112 (which will be described later).

A projection lens system 114 is positioned on the downstream side of the LCD panel 20. The projection lens system 114 magnifies the transmission image displayed on the LCD panel 20 at a predetermined magnification ratio so as to project an enlarged image on color printing paper 116.

The color printing paper 116 is positioned at a predetermined location by transport means 118. The periphery of an area to be exposed of the color printing paper 116 is masked with a mask 120. The transport means 118 for the color printing paper 116 is controlled by a controller 122. The controller 122 is connected with a driver 124 which revolves the turret plate 108.

The controller 122 is also connected to an image information reader 128 for reading data regarding an original image (which is an image recorded in each frame of a negative film 126 in this embodiment). In the image information reader 128, an image in each frame is scanned and subjected to color separation. The separated images are stored as image data in the form of a digital signal.

The stored image data are supplied to the controller 122, which in turn divides the image data of one original image into four image data items. The image data items are successively used to control pixels of the LCD panel 20, and each image is displayed on the LCD panel 20. The LCD panel 20 is movable in the X-Y direction in a horizontal plane. In this preferred embodiment, the LCD panel 20 can be roughly positioned at four different positions. In other words, the LCD panel 20 can be moved to positions respectively corresponding to the quartered surface of converging lens 112. The LCD panel 20 receives light from the light source 102 at the respective positions, whereby the transmission image can be reproduced onto the color printing paper 116 via the projection lens system 114.

Figure 6:
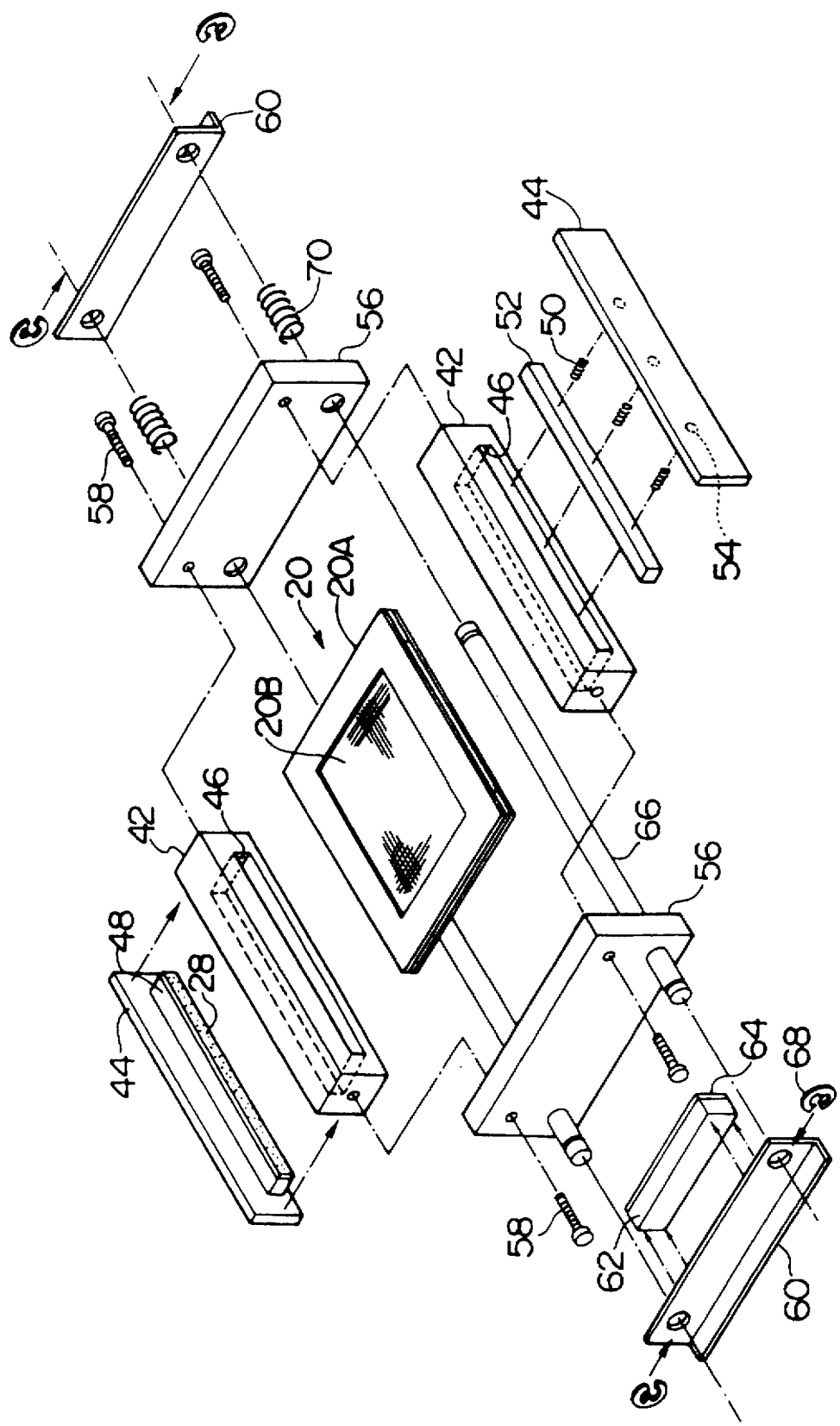
FIG. 6 is an exploded perspective view showing an LCD panel and its periphery.

FIGS. 6 and 7A show the structure of the LCD panel 20 and its periphery. The LCD panel 20 comprises a support plate 20A and a display element 20B. The support plate 20A is formed in the shape of a frame, and the display element 20B is supported in the rectangular aperture formed at the center of the support plate 20A. The display element 20B is further provided with a printed circuit board (not shown). A plurality of pixels are arranged in a matrix pattern on predetermined pitches on the display element 20B. These pixels are caused by electric means to display white, black and colors therebetween.

A pair of block members 42 are respectively disposed along two opposite sides of the LCD panel 20. Each of the block members 42 has an insertion opening 46 having a cross section almost equal to the side face of the LCD panel 20. The two sides of the LCD panel 20 are inserted into the respective insertion openings of the block members 42. Each of the insertion openings 46 penetrates the corresponding block member 42 such that it reaches the outer side surface of the block member 42 where a plate member 44 is attached.

A support member 48 is attached to the plate member 44 corresponding to one of the block members 42 so as to face the insertion opening 46. A piezoelectric element 28 is disposed on the side surface of the support member 48 that faces the insertion opening 46. The support member 48 and the piezoelectric element 28 are fitted into the insertion opening 46. The support member 48 may be attached to the plate member 44 using screws or an adhesive. The piezoelectric element 28 comes into contact with the lateral side surface of the LCD panel 20 in the block member 42. The piezoelectric element 28 moves the LCD panel 20 in the lateral direction (the X direction on the plane where pixels are arranged) by an amount set by control means.

A press member 52 is disposed on the other plate member 44 via compression coil springs 50 and is housed in the insertion opening 46. One end of each compression coil spring 50 provided between the press member 52 and the plate member 44 is fitted in a circular depression 54 formed in the plate member 44, whilst the other end is brought into contact with the press member 52. With this construction, the LCD panel 20 is pressed in such a direction as to come into contact with the piezoelectric element 28 by the press member 52.

The pair of block members 42 are respectively screwed to a pair of fixing plates 56 which are provided to run along the remaining two sides of the LCD panel 20, with screws 58. A bracket 60 is provided on the outer side of one of the fixing plates 56 such that a predetermined space is formed between the bracket 60 and the fixing plate 56. A piezoelectric element 64 attached to a support member 62 is positioned in the space between the bracket 60 and the fixing plate 56 such that the piezoelectric element 64 is in contact with the fixing plate 56. The piezoelectric element 64 moves the LCD panel 20 via the fixing plate 56 and the block members 42 in the longitudinal direction (the Y direction on the plane where the pixels are arranged) by an amount set by the control means.

A pair of parallel holes are formed in each of the pair of fixing plates 56 and the pair of brackets 60 such that the holes are arranged along a pair of parallel axes. Shafts 66 are passed through these holes. E-shaped stopper rings 68 are attached to both ends of the shafts 66 such that the stopper rings 68 are engaged with outer surfaces of the brackets 60. With this structure, the shafts 66 are prevented from axially moving.

Compression coil springs 70 are provided on the shafts 66 between the fixing plate 56 and the bracket 60 which are situated on the opposite side relative to the fixing plate 56 and the bracket 60 between which the piezoelectric element 64 is provided. The compression coil springs 70 urge the LCD panel 20 in such a direction as to come into contact with the piezoelectric element 64 via the fixing plate 56.

With this arrangement, the LCD panel 20 is in contact with the piezoelectric element 28, and the fixing plate 56 is in contact with the piezoelectric element 64. When none of the piezoelectric elements 28 and 64 is operated, the LCD panel is located at a reference position (0, 0), as shown in FIG. 7B. When only the piezoelectric element 28 is actuated, the LCD panel 20 is moved to position (x, 0). On the other hand, when only the piezoelectric element 64 is actuated, the LCD panel 20 is moved to position (0, y). When both piezoelectric elements 28 and 64 are actuated, the LCD panel 20 is moved to position (x, y).

As shown in FIG. 7A, the LCD panel unit 130 having the above mentioned structure (including a moving mechanism comprising the piezoelectric elements 28 and 64) is further mounted on the known X-Y moving table 132. As previously mentioned, this X-Y moving table 132 is used for moving the LCD panel unit 130 to four different positions. The detailed description of this moving table will be omitted. The LCD panel unit 130 is roughly positioned at four different locations by the X-Y moving table 132. The piezoelectric elements 28 and 64 are controlled for fine adjustment at four respective positions, whereby the accurate movement and positioning of the LCD panel 20 can be effected.

Figure 8A:
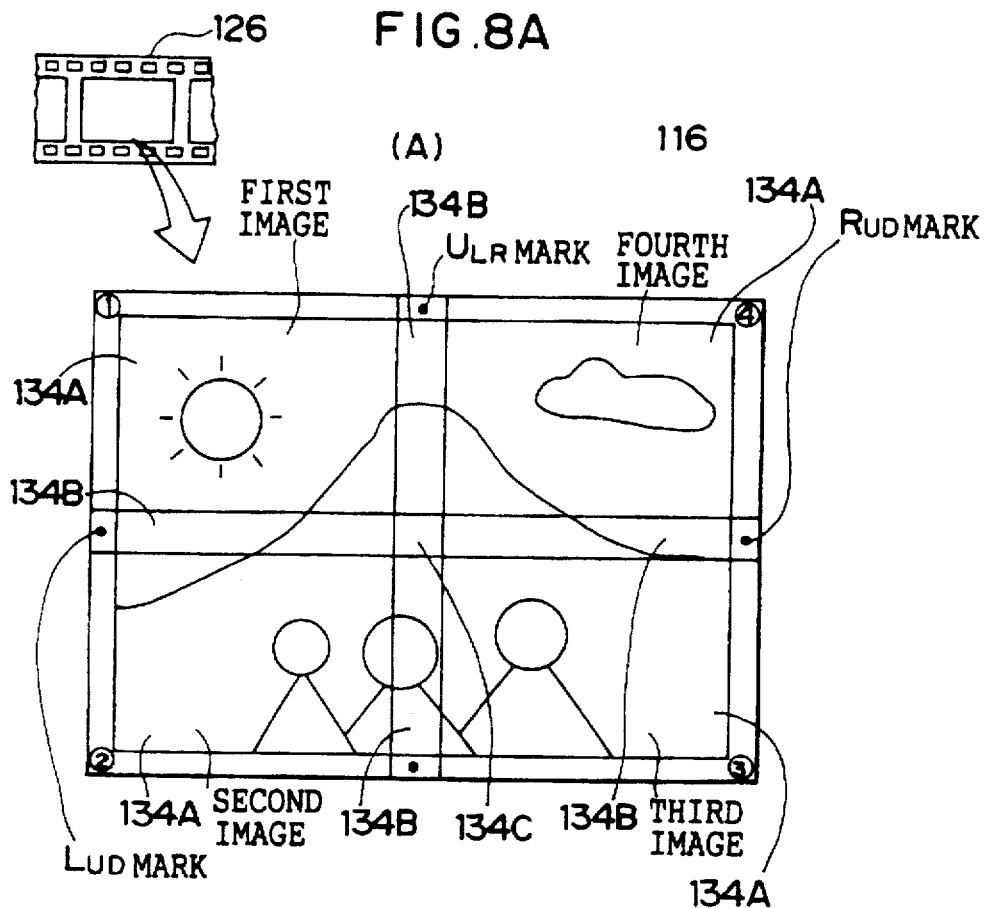
FIG. 8A is a plan view showing the size of an original image and the size of the image on a color printing paper.

As shown in FIG. 8A, split images are produced by the display element 20B at the four positions such that they overlap. These overlapped portions are subjected to exposure a plurality of times. In this preferred embodiment, areas forming a single complete image is categorized as single-exposure areas 134A, double-exposure areas 134B, and a fourfold-exposure area 134C.

Figure 8B:
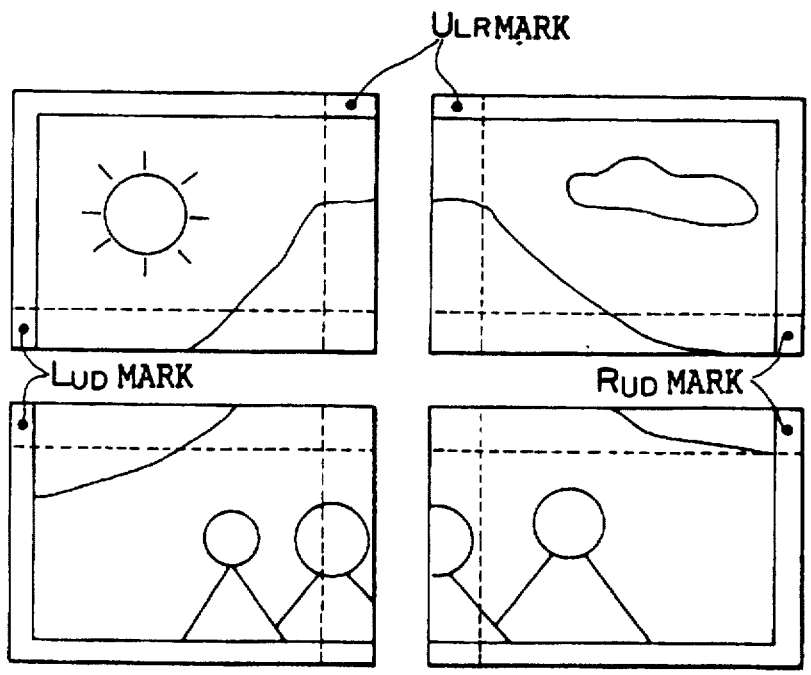
FIG. 8B is a plan view showing split images.
Figure 9A:
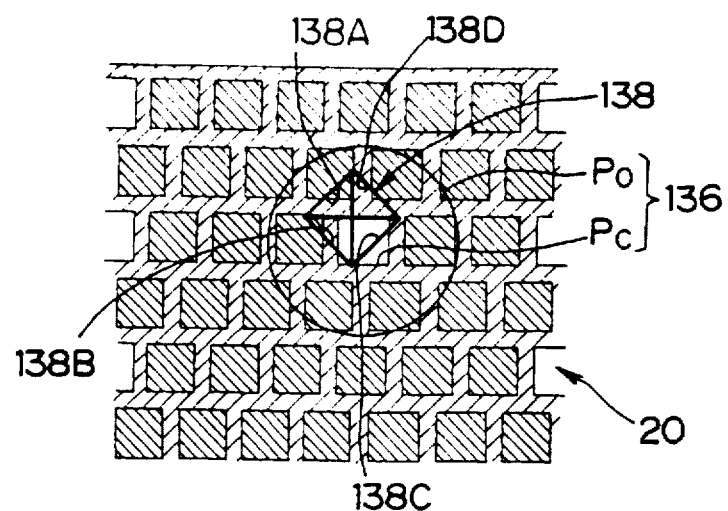
FIGS. 9A, 9B and 9C show enlarged views of the LCD panel showing a reference mark captured by a sensor.
Figure 9B:
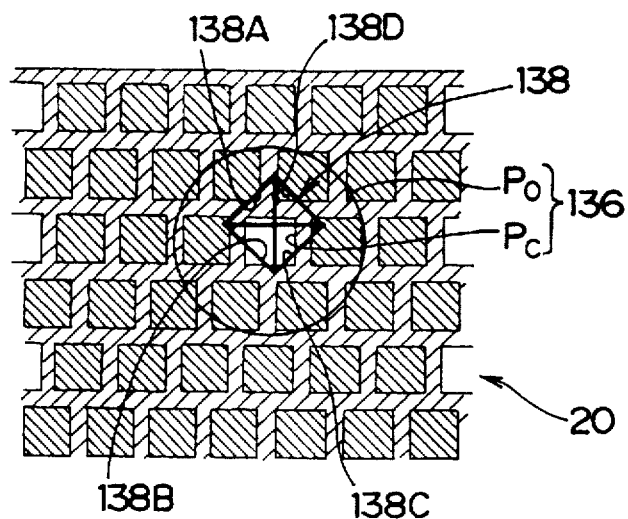
Figure 9C:
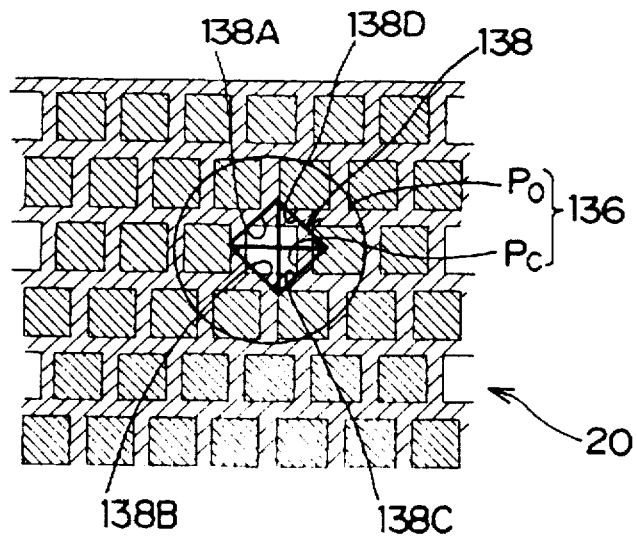

The display element 20B of the LCD panel 20 displays reference marks 136 at predetermined positions as well as an image based on the image data derived from the image information reader 128. The reference marks 136 are provided in the double-exposure areas 134B. For example, as shown in FIGS. 8A and 8B, the reference marks 136 are displayed in the double-exposure area 134B between images of upper left and upper right ($U_{LR}$ mark), the double-exposure area 134B between images of upper left and lower left ($L_{UD}$ mark), and the double-exposure area 134B between images of upper right and lower right ($R_{UD}$ mark), respectively. These reference marks 136 are detected by sensors 138 which will be described later (FIGS. 9A, 9B and 9C). It is possible to position the LCD panel to the respective predetermined four locations by aligning the reference marks with a corresponding one of the sensors.

FIGS. 9A, 9B and 9C show one example of the reference marks 136 displayed at predetermined positions on the LCD panel 20.

Each of the reference marks 136 consists of one transmission pixel $P_C$ and its surrounding pixels $P_O$. Each of the sensors 138 has a substantial diamond shape. Each sensor 138 has four divided light-receiving portions 138A, 138B, 138C, and 138D. Each of the light-receiving portions supplies the controller 122 with an electric signal which corresponds to the amount of received light.

The LCD panel 20 is roughly positioned by the movement produced by the X-Y moving table 132 and the movement produced by the piezoelectric elements 28 and 64 in the X and Y directions, so that any one of the light receiving portions of the sensor 138 faces the transmission pixel $P_C$. If no light receiving portion of the sensor 138 faces the transmission pixel PC, the controller 122 has to control either the X-Y table 132 or the piezoelectric elements 28 and 64 by sending a signal until the transmission pixel $P_C$ is detected.

The controller 122 stores information regarding the amount of light received by the respective light-receiving portions 138A, 138B, 138C, and 138D when the LCD panel 20 is positioned at the respective positions. While any one of the light receiving portions of the sensor 138 faces the transmission pixel $P_C$, the piezoelectric elements 28 and 64 are controlled in accordance with the difference among output signals from the light-receiving portions from 138A to 138D (difference in the amount of light received by the light-receiving portions 138A, 138B, 138C, and 138D) such that the difference decreases. As a result, the center of the sensor 138 matches with the transmission pixel $P_C$, whereby the positioning of the LCD panel 20 is completed (FIGS. 9A to 9C).

Exposure control for the LCD panel 20 when the LCD panel 20 is located in each of the positions (four positions) will be described.

The reference amount of exposure at each position is constant, so it is sufficient to make the reference amounts of exposure for four images equal to each other. As described above, the double-exposure areas 134B and the fourfold-exposure area 134C are exposed to twice or four times as much amount of light as they are exposed to under normal exposure control.

Figure 10A:
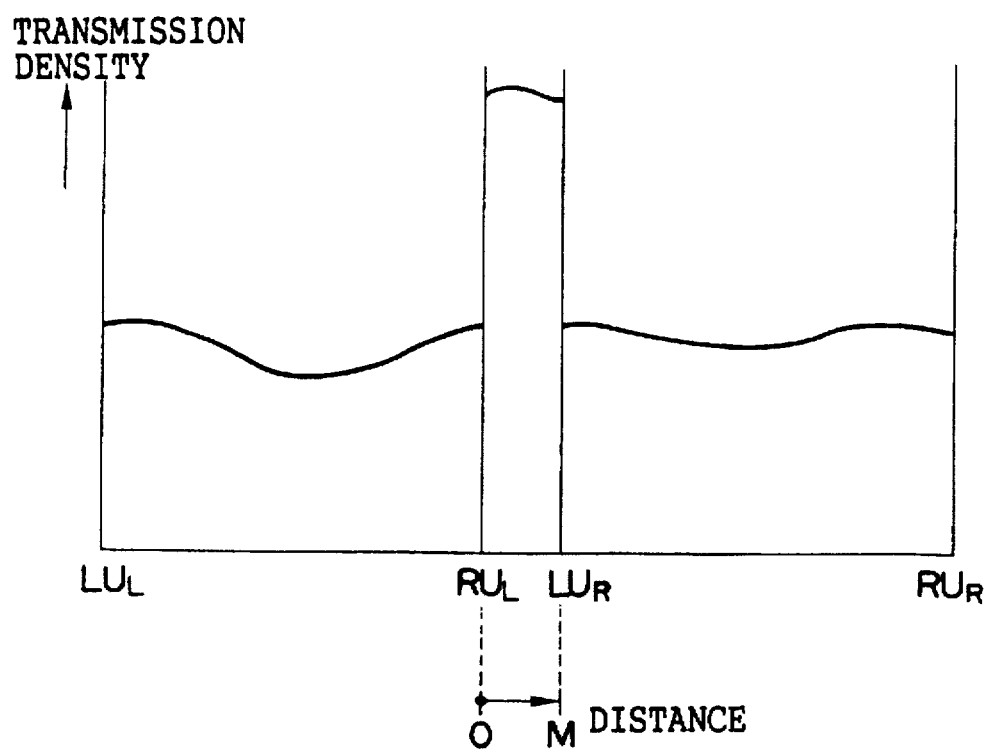
FIG. 10A is a graph showing the densities of split images.

As shown in FIG. 10A, the double-exposure area 134B between the image of upper left (between the vertical axes $LU_L$ and $LU_R$) and the image of upper right (between the vertical axes $RU_L$ and $RU_R$) is taken as an example for the following explanation. In the double-exposure area 134B, although image data match with each other between the adjacent split images, the transmission density becomes double.

Figure 10B:
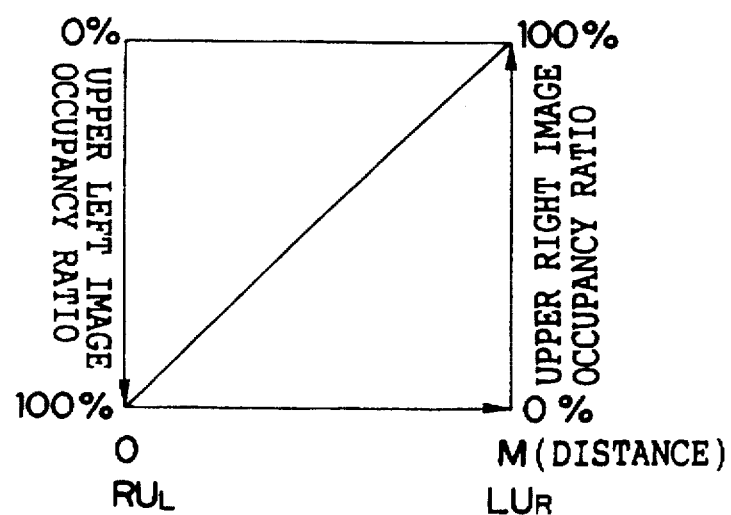
FIG. 10B is an explanatory chart showing image occupation rates in a double-exposure area.

To prevent this, in the double-exposing area 134B, the occupancy ratio of image data for the upper right image and the occupancy ratio of image data for the upper left image are determined as shown in FIG. 10B. The densities of the pixels of the LCD panel 20 are controlled based on these image occupancy ratios. In other words, a function (expressed as y=ax+b) is determined which is proportional to the distance from the left end (vertical axis $RU_L$) to a point which is located between the left end and the right end (vertical axis $LU_R$) of the double-exposure area 134B with the left end being set to 0. With this control, each image occupancy ratio becomes higher at a point closer to the corresponding image but becomes 1:1 at the middle point, which makes it possible to reduce the discontinuity of color and density to almost zero. In other words, in the event that the double-exposure area 134B is controlled using the image data regarding only one of the images, there would be no benefit in carrying out double-exposure. Moreover, it is quite likely for such a control to bring about discontinuity at the juncture between the split images. Furthermore, if the image data are divided into two by calculation so as to obtain two data items corresponding to two half images, discontinuity occurs due to calculation tolerance or the like.

In order to solve such a problem, in the preferred embodiment, the image data of the double-exposure area 134B are determined based on the image occupancy ratios of the two split images. For example, the image data of the upper left are completely used in the vicinity of the left end $RU_L$ of the double-exposure area 134B, whereas the image data for the upper right are completely used in the vicinity of the right end $LU_R$.

Figure 11A:
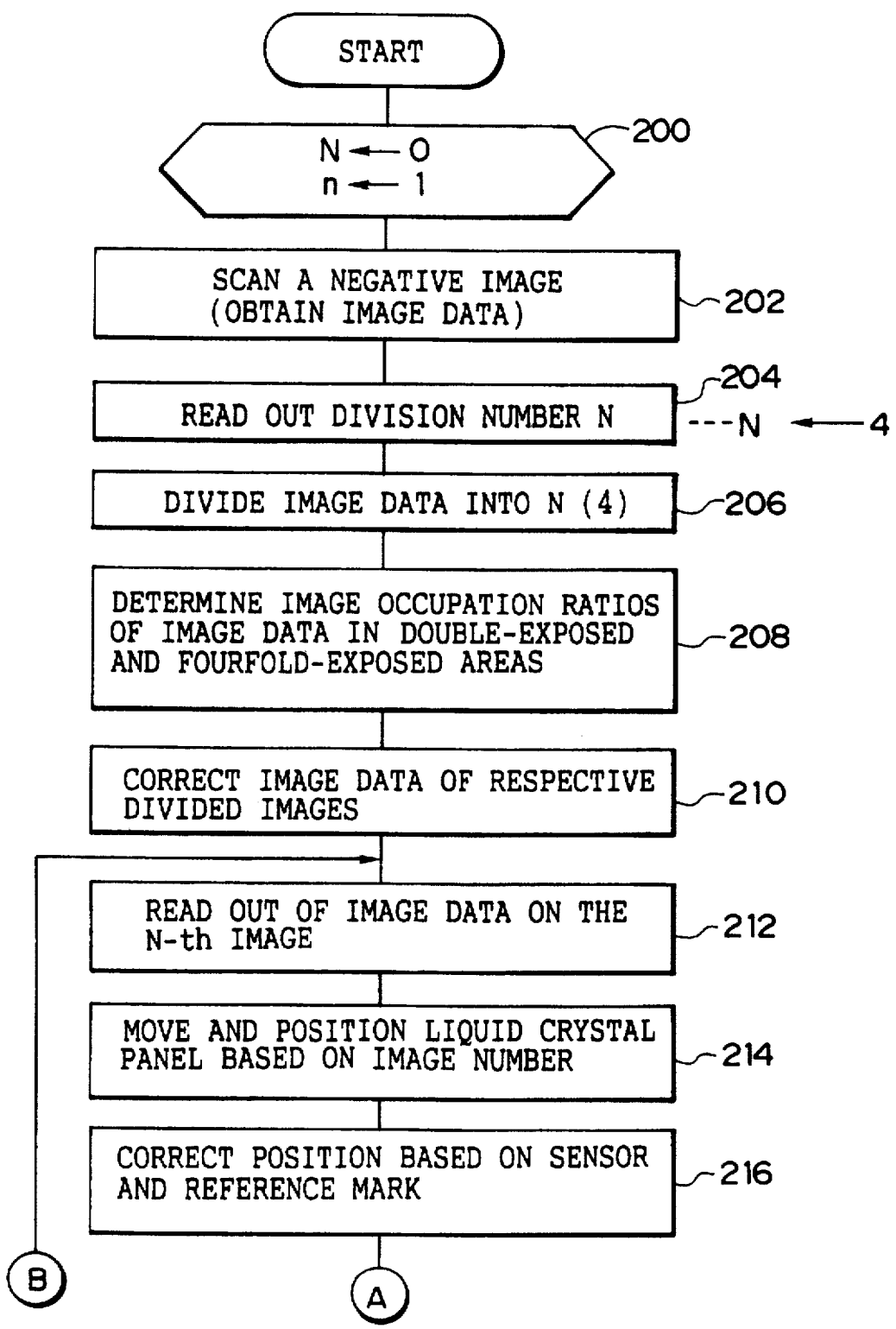
FIGS. 11A and 11B are a control flowchart showing procedures of photographic printing according to the embodiment of the present invention.
Figure 11B:
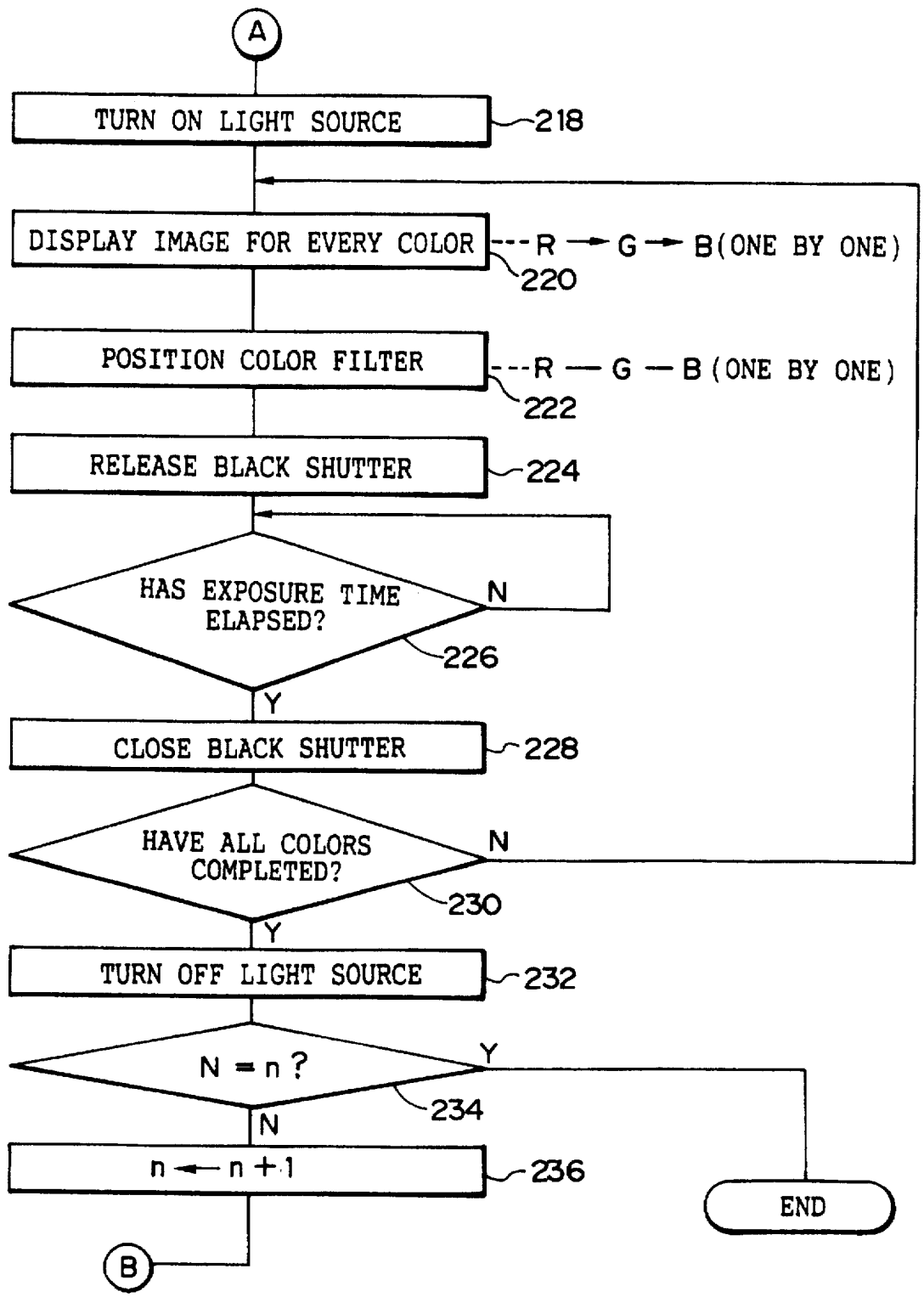

The operation of the split image exposure apparatus will now be described with reference to a flowchart shown in FIGS. 11A and 11B.

An explanation will be given of the case where an original image (35 mm negative image) is printed on color printing paper 116 by exposure to obtain a print having a large enlarging magnification (quarter size which measures 254 mm×305 mm), as shown in FIG. 8A. As shown in FIG. 8B, the original image is divided into four subdivisional images; namely, ones shown upper left, lower left, lower right, and upper right. These four split images are designated, in the above mentioned order, as a first image, a second image, a third image, and a fourth image, respectively.

Variables N and n are initialized (N=0, n=1) in step 200. In step 202, a negative image is scanned by the image information reader 128 to obtain image data.

The number N of division of the original image is read out in step 204. The number N may be preset, or automatically calculated in accordance with a magnification ratio. Alternatively, the number N may be manually input. This preferred embodiment is based on the assumption that the original image is divided into four, and hence the image data are divided into N (=4) in step 206.

In step 208, occupancy ratios of image data are determined for the double-exposure areas 134B and the fourfold-exposure area 134C. For example, in each double-exposure area 134B, the image occupancy ratio of image data representing an image on one side of the double-exposure area 134 is set so as to be largest at one end of the double-exposure area 134 adjacent to that image and to decrease in the direction away from that end, as shown in FIG. 10B.

In step 210, the image data (density) of the double-exposure areas 134B and the fourfold-exposure area 134C are respectively corrected on the basis of the thus determined image occupancy ratios. The process then proceeds to step 212.

The image data of the n-th image (the first image shown in FIG. 8B for the first time) is read out in step 212, and the LCD panel 20 is moved based on the image number in step 214. This movement is precisely effected, using rough movement produced by the X-Y table 132 and fine movement produced by the piezoelectric elements 28 and 64 in combination. However, such a mechanical movement cannot sufficiently compensate for slight pixel differences, which may bring about discontinuity between the adjacent split images. To prevent the discontinuity, the sensor 138 detects one of the reference marks 136 previously provided at predetermined positions on the LCD panel 20 together with the images, so that the LCD panel 20 is accurately positioned.

Specifically, a part of the sensor 138 usually captures a part of a reference mark 136 as a result of mechanical movements produced by the X-Y table 132 and piezoelectric elements 28 and 64, as shown in FIGS. 9A, 9B and 9C.

The piezoelectric elements 28 and 64 are controlled in accordance with the difference between the signals output from the light-receiving portions 138A, 138B, 138C, and 138D (the difference in the amount of received light) so as to reduce the difference. As a result, the centers of the sensor 138 and the transmission pixel $P_C$ match with each other, thereby completing the positioning of the LCD panel. In this way, the split images can be positioned pixel-by-pixel.

The light source 102 is turned on in step 218. An image is displayed for every color in step 220. Specifically, a color image is subjected to color separation into the three primary colors, R, G, and B. The images corresponding to R, G, and B must be exposed. Therefore, exposure is performed three times in total. Although the exposing order is not specified, an R image is first exposed following the order of R, G, and B in the preferred embodiment.

A filter corresponding to each of the images (an R filter first in this case) is positioned in step 222. Then, a black shutter 111 is released in step 224. With this operation, the image is printed onto the color printing paper 116 by exposure.

In step 226, it is judged as to whether a predetermined period of time has lapsed. With an affirmative judgment, the black shutter 11 is closed in step 228. In the following step 230, it is judged as to whether exposure has been performed for all three colors, namely R, G, and B. With a negative judgment, the process returns to step 220 so as to repeat the above mentioned procedures following the above mentioned predetermined order with a different color. When the exposure have been performed three times, and such completion has been judged, the process proceeds to step 232.

The light source is turned off in step 232. In the following step 234, it is judged as to whether the number "n" of exposures for one image has reached the number of division N. With a negative judgment, n is incremented in step 236 and the process returns to step 212 so as to carry out exposure control for the next split image (the second image for the second time, the third image for the third time, and the fourth image for the four time, respective images being shown in FIG. 8B). When the fourth exposure is completed, an affirmative judgment is made in step 234, which completes the process.

(Complementary Explanations for Respective Systems)

(1) Illuminating System

In the preferred embodiment, an LED array may be employed as the light source 102, besides a halogen lamp. With the use of an LED array, the separation filter 104 becomes unnecessary.

An optical system for collecting light to the LCD panel 20 usually tends to provide poor contrast or cause variations in spectral distribution of transmitted light in the event that the incident angle of the light with respect to the LCD panel 20 is off the right angle. Therefore, it is desirable to render incoming light as parallel as possible and to let the light enter the LCD panel 20 at a right angle.

If the image display area of the LCD panel 20 can be illuminated at all positions without moving the illuminating system, as is the case in the preferred embodiment, inconsistencies in density and color caused by the illuminating system in the juncture between the split images become unnoticeable. However, in order to increase the efficiency of exposure of the color printing paper 116, an illuminating system which can illuminate only an area equivalent in size to the image displaying area may be moved along with the movement of the LCD panel (the movement of the X-Y moving table 132).

(2) Liquid Crystal Display Panel 20 For example, a-SiTFT and p-SiTFT may be employed for the LCD panel 20. Since the LCD panel 20 changes its optical characteristics as a result of temperature changes, it is desirable to provide the LCD panel 20 with a cooling mechanism including an air-cooling system.

Figure 12A:
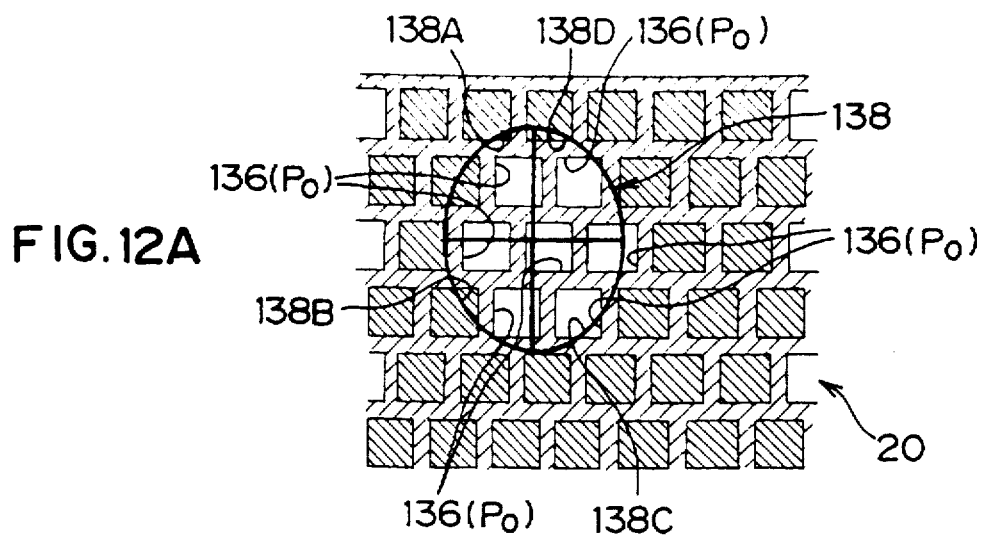
FIGS. 12A, 12B, and 12C are enlarged views of the surface of an LCD panel showing a reference mark according to a modified embodiment in a state in which the reference mark is captured by a sensor.
Figure 12B:
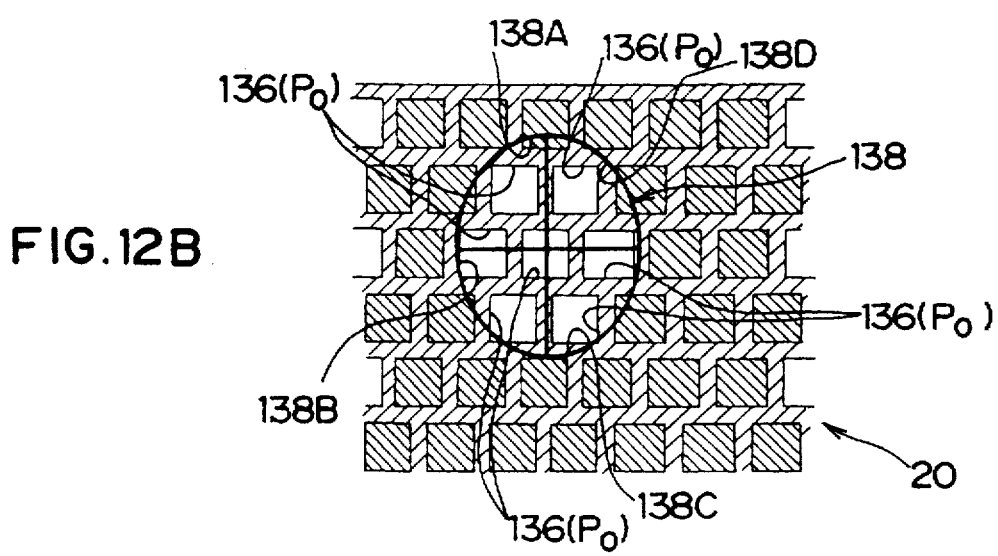
Figure 12C:
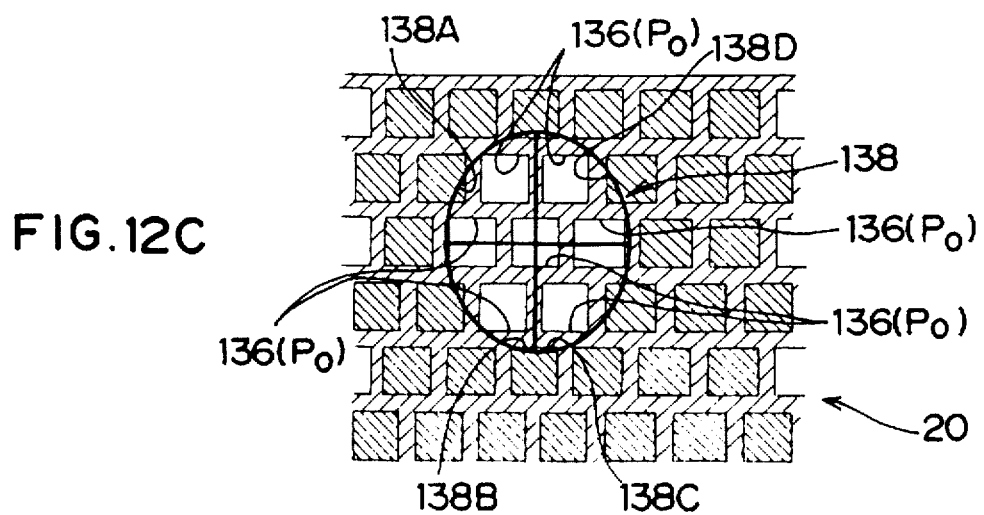

Each of the reference marks 136 may consist of one pixel, as is the case in the preferred embodiment. However, each reference mark may consist of a plurality of pixels (seven pixels) as shown in FIGS. 12A to 12C. With the use of a plurality of pixels as the reference mark 136, the light-receiving portions of the sensor 138, namely 138A, 138B, 138C, and 138D may have their light-receiving areas enlarged, thereby implementing capturing control over a larger area.

Figure 13A:
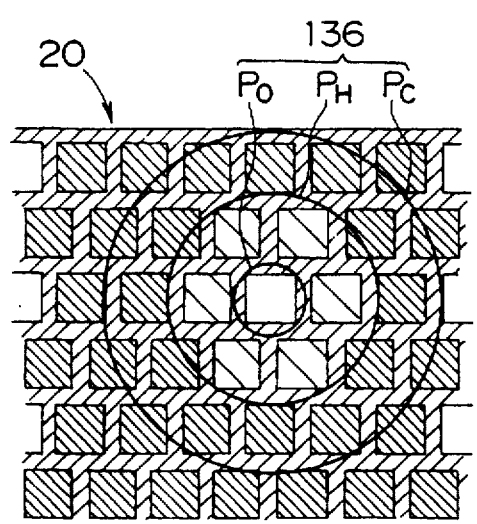
FIGS. 13A, 13B, 13C and 13D are enlarged views of the surface of an LCD panel showing a reference mark according to another modified embodiment in a state the reference mark is captured by a sensor.
Figure 13B:
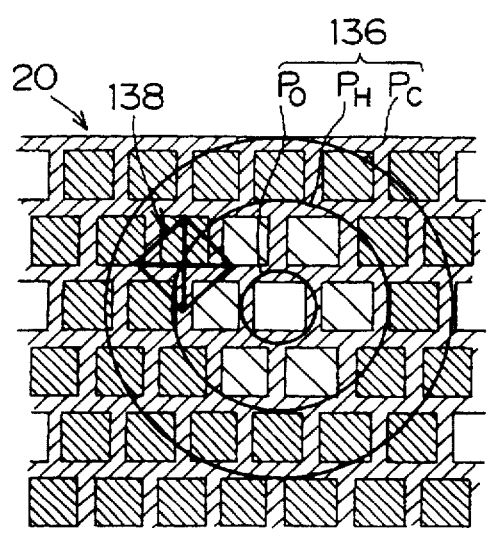
Figure 13C:
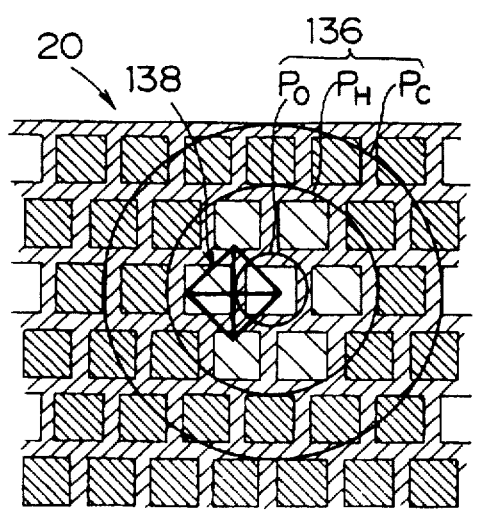
Figure 13D:
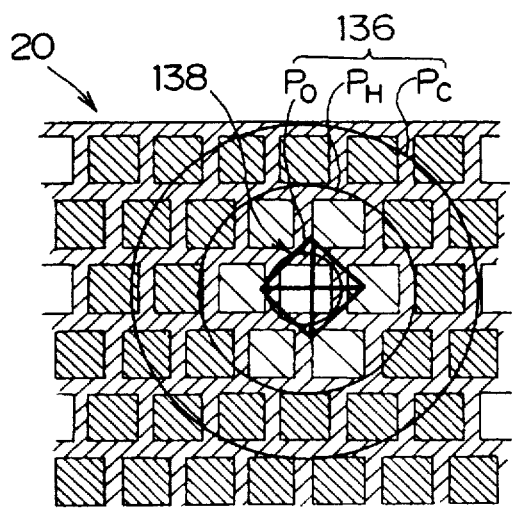

A reference mark 136 having three different density levels (all transmissible $P_O$, half-transmissible $P_H$, and non-transmissible $P_C$) as shown in FIGS. 13A to 13C, makes it possible to reduce a capturing time.

(3) Optical Projection System

To efficiently guide illuminating light (the light source 102) toward the color printing paper 116, it is desirable to form the light-receiving angle of the projection lens system 114 to be greater than the light-collecting angle of the converging lens 112.

(4) Exposure Plane (Surface of Color Print Paper 116)

A suction belt is desirable for use as means for feeding and conveying the color printing paper 116 to maintain the surface of the color printing film 116 flat during exposure.

Figure 14:
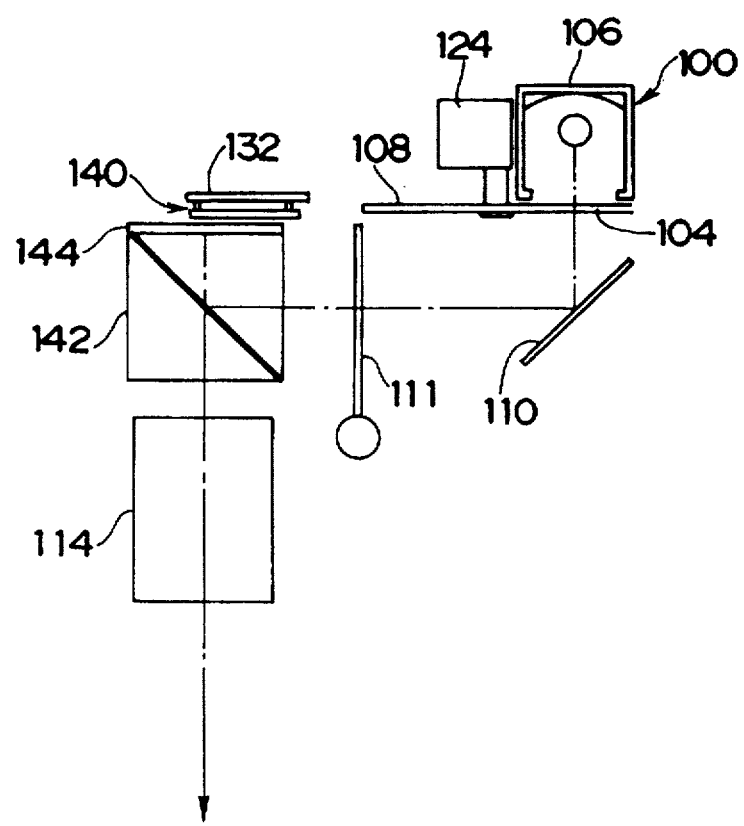
FIG. 14 is a schematic illustration showing the structure of an optical system using a reflective LCD panel.

Although the LCD panel 20 of a transmissive type is used for exposure control of split images in this embodiment, an LCD panel 140 of a reflection type may also be used for exposure control of split images, as shown in FIG. 14. The outline of structure of this LCD panel 140 will now be described. The same reference numerals are provided to designate the corresponding elements in the previous embodiment, and the explanation thereof will be omitted here for brevity.

As shown in FIG. 14, a polarizing beam splitter 142 is disposed on the downstream side of the black shutter 111. The incoming light from the reflecting mirror 110 is reflected by a reflecting plane of the polarizing beam splitter 142 at an angle of 45 degrees, and the thus reflected light reaches the reflecting LCD panel 140 via a ¼ wavelength plate 144. The light is reflected by the LCD panel 140. The thus reflected light becomes transmitted light of the image, again arriving at the polarizing beam splitter 142 via the ¼ wavelength plate 144. Then, the light linearly passes through the polarizing beam splitter 142 and reaches the optical projection system 114.

According to the above mentioned structure, split exposure control can be carried out in the same manner as it is made by the transmitting LCD panel.

Increasing the pixel density of the LCD panel is effective in obtaining a high-resolution image. However, as a pixel becomes smaller as a result of increased density, an electrode occupies a larger area of the pixel, which significantly reduces the ratio of the transparent area in the case of a transmissive type. The use of the reflecting LCD panel 140 enables a dual structure of electrodes and a pixel plane, thereby solving the above mentioned problem.

As described above, for exposure control, each occupancy ratio of the image data for the double-exposure area 134B and the fourfold-exposure area 134C is set so as to be larger in the direction closer to the corresponding overlapped split images, thereby resulting in improved continuity of density and color as well as suppressed differences in color and density.

It is possible to realize the positioning of the split images on the pixel unit basis not only by mechanical movements produced by the X-Y table 132 and piezoelectric elements 28 and 64 but also by control for capturing the reference marks 136 using the sensor 138, thereby eliminating positional errors almost completely.

In the preferred embodiment, split images are positioned by moving the LCD panel 20 (140), thereby preventing distortion, skew, and discontinuity of color and density caused by the optical system, and maintaining continuity of junctions over all of the image area.

When split exposure is carried out by moving the color printing paper 116, it is necessary to precisely control the amount of feed of the color printing paper. Feed errors are detected by integrating a signal from a rotation angle sensor which is provided coaxially with a feed roller. The positions of the split images on the LCD panel 20 (140) and the position of the LCD panel 20 (140) are corrected by use of the detected signal, so as to eliminate the feed errors. In the event that a skew is produced in the image, it is necessary to eliminate a difference in diameter between both ends of the feed roller, because the correction of skew is very difficult.

Although the LCD panel 20 (140) is employed in the preferred embodiment, an electro-luminescence (EL) panel or an LED surface luminescent panel may also be employed. In the case where a self-illuminating element such as an LED surface luminescent panel is employed, the illuminating system becomes unnecessary.

Simultaneous exposure of three colors using three LCD panels 20 (140) can be implemented by use of a dichroic mirror.

For reducing exposure time, a pair of compound eye lenses are provided at both sides of the LCD panel 20 (140), and the focal lengths of the lenses are substantially matched with each other, which makes it possible to reduce an exposure time even in the case of a small aperture ratio, as described in JP-B-4-3856.

The sensors 138 for detecting the position of the LCD panel 20 (140) are not necessarily positioned at the point where it can directly receive a pattern of the LCD panel 20 (140), but may also be positioned in the vicinity of the color printing paper 116 so as to receive the pattern via the projection lens.

Discontinuity of density and color at junctions between split images due to unevenness of the illuminating system and optical projection system, and discontinuity of junctions resulting from distortion of the optical projection system can be made less noticeable by projecting a standard image and measuring unevenness of the projected standard image (for example, by receiving the image with a plane sensor). As a result, an image can be displayed after the density, color and distortion thereof have been corrected.

The piezoelectric elements used for adjusting the position of an image can also be used for what is known as pixel displacement for increasing resolution through multi-exposure, wherein an image is exposed a plurality of times at some different positions displaced by about half of the element pitch.

As described above, the split image exposure method of the present invention can suppress discontinuity of density and color in junctions between split images when the original image divided into a plurality of subdivisions is exposed using a planar element, thereby realizing high-quality and high-resolution exposure of the image.

While the embodiment of the present invention, as herein disclosed, constitutes a preferred form, it is to be understood that other forms may also be adopted.

What is claimed is:

1. A split image exposure method comprising the steps of:
    dividing an original image to be exposed into a plurality of split images;
    successively displaying the plurality of split images on a planar element; and
    successively projecting the displayed split images onto different areas of a photosensitive material, thereby successively printing the displayed split images on the photosensitive material.

2. A split image exposure method according to claim 1, wherein a junction between split images is connected by aligning reference marks displayed on the planar element.

3. A split image exposure method according to claim 2, wherein each of the reference marks has at least three density levels.

4. A split image exposure method according to claim 2, wherein alignment of the reference marks is carried out by at least one of movement of the planar element itself, movement of pixels on the planar element, and change in the direction of projection of each split image caused by an optical system.

5. A split image exposure method according to claim 1, wherein adjacent split images are projected by exposure so as to overlap, and the reference density of the overlapped area is made equal to the reference density of the non-overlapped areas.

6. A split image exposure method according to claim 2, wherein adjacent split images are projected by exposure so as to overlap, and the reference density of the overlapped area is made equal to the reference density of the non-overlapped areas.

7. A split image exposure method according to claim 5, wherein the reference density of each of the overlapped split images in the overlapped area is controlled in accordance with a function of the distance from one end of the overlapped area adjacent to one split image to a point between the one end and the other end of the overlapped area adjacent to the other split image.

8. A split image exposure method comprising the steps of:
  dividing an original image to be exposed into a plurality of split images;
  successively displaying the plurality of split images on a planar element; and
  successively positioning the planar element at a plurality of split positions so as to project the displayed split images onto different areas on a photosensitive material, thereby successively printing the displayed split images on the photosensitive material.

9. A split image exposure method according to claim 8, wherein a junction between split images is connected by aligning reference marks displayed on the planar element.

10. A split image exposure method according to claim 9, wherein each of the reference marks has at least three density levels.

11. A split image exposure method according to claim 9, wherein alignment of the reference marks is carried out by at least one of movement of the planar element itself, movement of pixels on the planar element, and change in the direction of projection of each split image caused by an optical system.

12. A split image exposure method according to claim 8, wherein adjacent split images are projected by exposure so as to overlap, and the reference density of the overlapped area is made equal to the reference density of the non-overlapped areas.

13. A split image exposure method according to claim 9, wherein adjacent split images are projected by exposure so as to overlap, and the reference density of the overlapped area is made equal to the reference density of the non-overlapped areas.

14. A split image exposure method according to claim 12, wherein the reference density of each of the overlapped split images in the overlapped area is controlled in accordance with a function of the distance from one end of the overlapped area adjacent to one split image to a point between the one end and the other end of the overlapped area adjacent to the other split image.

15. A split image exposure method comprising the steps of:
  dividing an original image to be exposed into a plurality of split images;
  successively displaying the plurality of split images on a planar element; and
  causing an optical system to change the direction of projection of each split image displayed on the planer element so as to successively project the displayed split images onto different areas on a photosensitive material, thereby successively printing the displayed split images on the photosensitive material.

16. A split image exposure method according to claim 15, wherein a junction between split images is connected by aligning reference marks displayed on the planar element.

17. A split image exposure method according to claim 16, wherein each of the reference marks has at least three density levels.

18. A split image exposure method according to claim 16, wherein alignment of the reference marks is carried out by at least one of movement of the planar element itself, movement of pixels on the planar element, and change in the direction of projection of each split image caused by an optical system.

19. A split image exposure method according to claim 15, wherein adjacent split images are projected by exposure so as to overlap, and the reference density of the overlapped area is made equal to the reference density of the non-overlapped areas.

20. A split image exposure method according to claim 16, wherein adjacent split images are projected by exposure so as to overlap, and the reference density of the overlapped area is made equal to the reference density of the non-overlapped areas.

21. A split image exposure method according to claim 19, wherein the reference density of each of the overlapped split images in the overlapped area is controlled in accordance with a function of the distance from one end of the overlapped area adjacent to one split image to a point between the one end and the other end of the overlapped area adjacent to the other split image.

* * * * *